US011858160B2

(12) United States Patent
Dao et al.

(10) Patent No.: US 11,858,160 B2
(45) Date of Patent: Jan. 2, 2024

(54) ULTRASONIC CUTTING SYSTEM AND METHOD

(71) Applicant: Lockheed Martin Corporation, Bethesda, MD (US)

(72) Inventors: Linda Dao, Fort Worth, TX (US); Matthew Timothy McKee, Fort Worth, TX (US); Marquis Trevon Henderson, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 239 days.

(21) Appl. No.: 17/470,333

(22) Filed: Sep. 9, 2021

(65) Prior Publication Data

US 2023/0071522 A1 Mar. 9, 2023

(51) Int. Cl.

| | |
|---|---|
| ***B26D 7/08*** | (2006.01) |
| ***B26D 5/08*** | (2006.01) |
| ***B26D 7/00*** | (2006.01) |
| ***B26D 7/26*** | (2006.01) |

(52) U.S. Cl.

CPC ............ *B26D 7/086* (2013.01); *B26D 5/086* (2013.01); *B26D 7/0006* (2013.01); *B26D 7/2628* (2013.01)

(58) Field of Classification Search

CPC .... B26D 7/2628; B26D 7/086; B26D 7/0006; B26D 7/08; B26D 7/00; B26D 7/26; B26D 5/08; B26D 5/086

See application file for complete search history.

(56) References Cited

U.S. PATENT DOCUMENTS 3,737,361 A * 6/1973 Obeda ............... B29C 66/86521 228/1.1
4,596,171 A * 6/1986 Gerber ................... B26D 7/086 83/749
4,761,884 A 8/1988 Nguyen et al.
(Continued)

FOREIGN PATENT DOCUMENTS

CN 114986576 A * 9/2022
KR 20220151817 A * 11/2022

OTHER PUBLICATIONS

Translation of KR 20220151817 A, May 2023.*
Translation of CN-114986576-A, May 2023.*

*Primary Examiner* — Nhat Chieu Q Do
(74) *Attorney, Agent, or Firm* — Baker Botts L.L.P.

(57) ABSTRACT

Systems and methods include using an ultrasonic cutter tool to cut a seal. The system comprises an ultrasonic cutter tool disposed onto a railing system coupled to a platform, wherein the ultrasonic cutter tool is configured to translate along the railing system. The system further comprises a power source electrically coupled to the ultrasonic cutter tool, and an alignment mold disposed parallel to the railing system and offset by a distance. The system further comprises one or more roller bearing carriages coupled to the railing system, wherein each of the one or more roller bearing carriages comprises a set of roller bearings, wherein each set of roller bearings is disposed over the alignment mold, wherein each set of roller bearings is configured to translate along the alignment mold as each of the one or more roller bearing carriages translates along the railing system.

19 Claims, 4 Drawing Sheets

(56) References Cited

U.S. PATENT DOCUMENTS

| | | | | | |
|---|---|---|---|---|---|
| 4,922,774 | A * | 5/1990 | Oldeman | B29D 30/46 83/175 |
| 5,061,331 | A * | 10/1991 | Gute | B26D 7/018 156/251 |
| 5,265,508 | A | 11/1993 | Bell et al. | |
| 5,825,652 | A * | 10/1998 | LeBlond | B26F 1/3813 81/463 |
| 5,848,930 | A | 12/1998 | Jones | |
| 6,467,385 | B1 | 10/2002 | Buttrick et al. | |
| 6,604,895 | B1 | 8/2003 | Schroeder | |
| 7,628,679 | B2 | 12/2009 | Froeschner et al. | |
| 8,387,502 | B2 * | 3/2013 | Evans | B26D 7/20 83/746 |
| 9,061,431 | B1 | 6/2015 | Amerine, Sr. | |
| 9,375,857 | B2 | 6/2016 | Evans | |
| 2002/0168241 | A1 | 11/2002 | David et al. | |
| 2006/0196332 | A1 * | 9/2006 | Downing | B26D 7/018 83/100 |

* cited by examiner

ULTRASONIC CUTTING SYSTEM AND METHOD

TECHNICAL FIELD

This disclosure generally relates to an ultrasonic cutter, and more specifically to a system and method for aligning and cutting seals with an ultrasonic cutter.

BACKGROUND

Panels on aircraft use variable coatings, such as seals, during installation. Generally, each seal is manually trimmed to meet specification requirements. Seals that are not trimmed properly can result in frayed edges and installation issues, such as adjacent panel mating. Manual trimming is not consistent and can result in a loss of time and cost due to rework.

BRIEF DESCRIPTION OF THE DRAWINGS

To assist in understanding the present disclosure, reference is now made to the following description taken in conjunction with the accompanying drawings, in which.

DETAILED DESCRIPTION

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 4, where like numbers are used to indicate like and corresponding parts. Described herein are various systems and methods for aligning a seal for cutting with an ultrasonic cutter tool.

Figure 1:
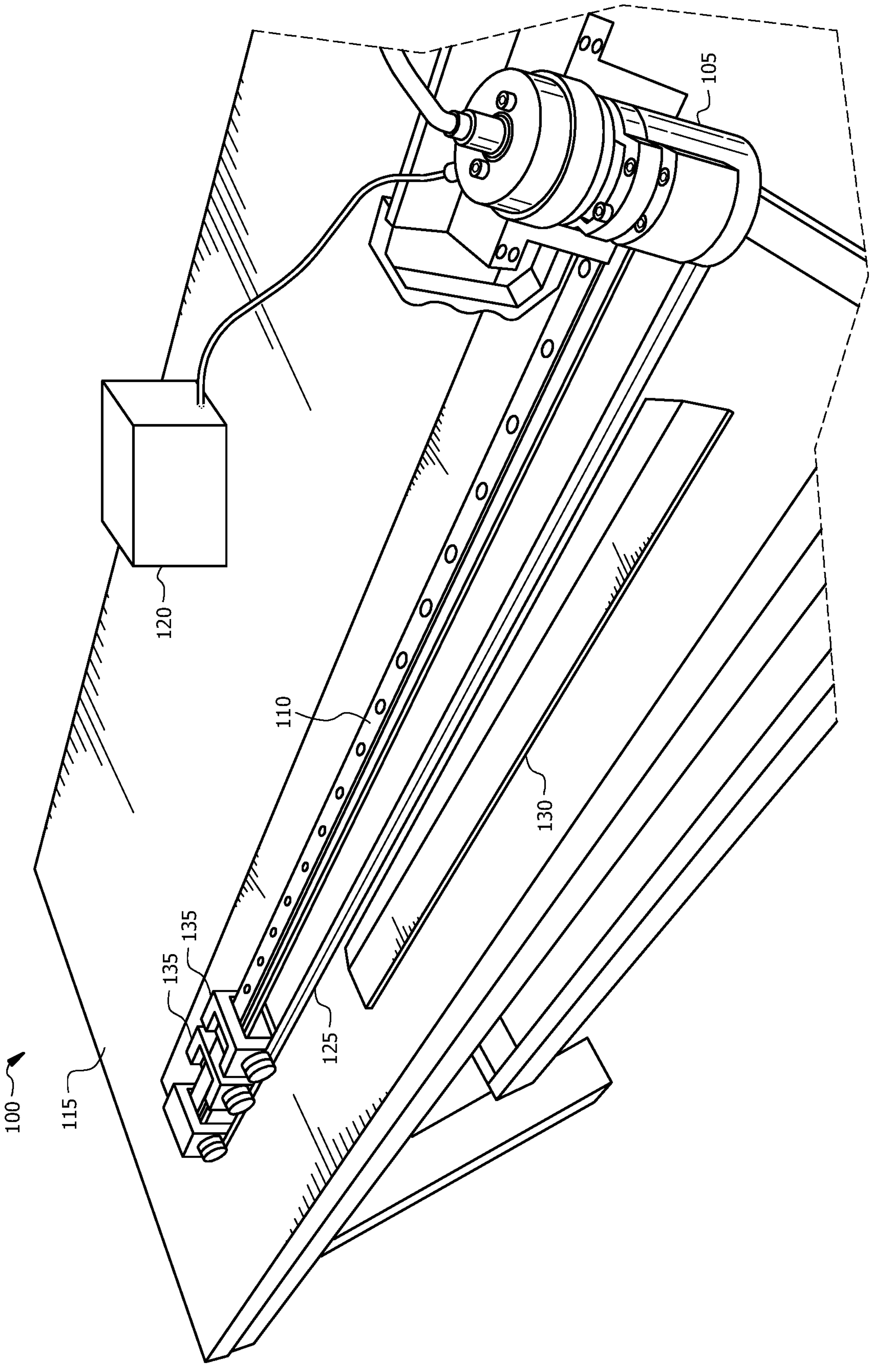
FIG. 1 illustrates an example cutting system, according to certain embodiments.

FIG. 1 illustrates an example cutting system 100. The cutting system 100 may comprise an ultrasonic cutter tool 105 and a railing system 110 disposed on a platform 115. While the example cutting system 100, throughout this disclosure, may be disposed on the platform 115, the cutting system 100 is not limited to being disposed on the platform 115 and may be disposed on any suitable surface. As illustrated, the ultrasonic tool 105 may be coupled to the railing system 110 and may be configured to translate along the length of the railing system 110. The railing system 110 may be secured to the platform 115 through any suitable means (for example, using fasteners). The cutting system 100 may further comprise a power source 120 operable to provide power to the ultrasonic cutter tool 105. The power source 120 may be electrically coupled to the ultrasonic cutter tool 105. In embodiments, any suitable source of power may be used as the power source 120. Without limitations, the power source 120 may be a generator, one or more batteries, and any combination thereof. The power source 120 may be disposed at any suitable location relative to the ultrasonic cutter tool 105. While the example power source 120 may be illustrated as being disposed on the platform 115, the power source 120 is not limited to such a location and may be disposed remote from the platform 115.

The cutting system 100 may further comprise an alignment mold 125 disposed on the platform in proximity to the railing system 110. In embodiments, the alignment mold 125 may be disposed parallel to the railing system 110 and offset by a distance. This distance may be any suitable length. Without limitations, the alignment mold 125 may be disposed at a distance within a range of about 0.5 inches to about 10 inches. The alignment mold 125 may be operable to receive a seal 130, wherein the seal 130 may be disposed partially on the alignment mold 125. In embodiments, the ultrasonic cutter tool 105 may be operable to cut the seal 130 as the ultrasonic cutter tool 105 translates along the railing system 110. As illustrated, the cutting system 100 may further comprise one or more roller bearing carriages 135 coupled to the railing system 110. Each one of the one or more roller bearing carriages 135 may be at least partially disposed over the alignment mold 125, and each one of the one or more roller bearing carriages 135 may be configured to translate along the alignment mold 125 as each of the one or more roller bearing carriages 135 translates along the railing system 110.

Figure 2:
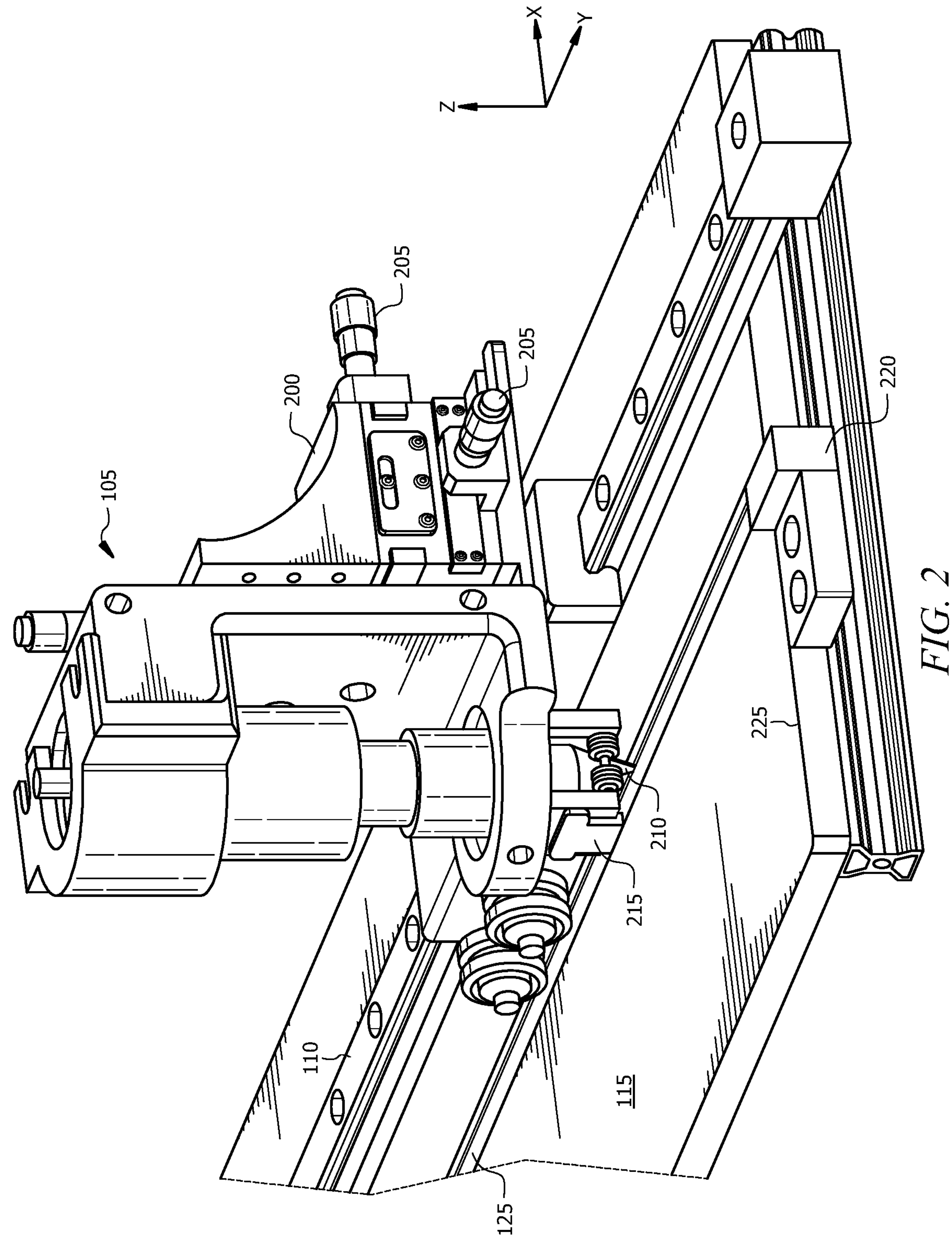
FIG. 2 illustrates an example ultrasonic cutter tool, according to certain embodiments.

FIG. 2 illustrates an example ultrasonic cutter tool 105 of the cutting system 100 (referring to FIG. 1) disposed on the platform 115. The ultrasonic cutter tool 105 may be any suitable size, height, shape, and any combinations thereof. In embodiments, the ultrasonic cutter tool 105 may comprise any suitable materials, including, but not limited to, metals, nonmetals, polymers, ceramics, composites, and any combinations thereof. As illustrated, a mechanical adjuster 200 may be coupled to the ultrasonic cutter tool 105. The mechanical adjuster 200 may be operable to translate the ultrasonic cutter tool 105 in relation to the railing system 110 for precise cut-path alignment and or offset. In embodiments, the translation of the ultrasonic cutter tool 105 is not limited by a certain distance. The mechanical adjuster 200 may be any suitable size, height, shape, and any combinations thereof. In embodiments, the mechanical adjuster 200 may comprise any suitable materials, including, but not limited to, metals, nonmetals, polymers, ceramics, composites, and any combinations thereof. The mechanical adjuster 200 may comprise one or more actuators 205 operable to translate the ultrasonic cutter tool 105 in relation to the railing system 110 once actuated. Each of the one or more actuators 205 may be operable to translate the ultrasonic cutter tool 105 along an axis. For example, one of the one or more actuators 205 may be actuated to translate the ultrasonic cutter tool 105 along an x-axis or z-axis in relation to the railing system 110. In other embodiments, the one of the one or more actuators 205 may be actuated to translate the ultrasonic cutter tool 105 along a y-axis if the railing system 110 is configured to be perpendicular to such an axis.

In embodiments, the one or more actuators 205 may be actuated to position a blade 210 of the ultrasonic cutter tool 105 above the alignment mold 125. The blade 210 may be secured within the ultrasonic cutter tool 105 through any suitable means, including fasteners. The blade 210 may be any suitable size, height, shape, and any combinations thereof. For example, the blade 210 may comprise a triangular shape. The blade 210 may be operable to vibrate at a designated frequency based on the power provided by the power source 120 (referring to FIG. 1). The ultrasonic cutter tool 105 may utilize the blade 210, while vibrating, to cut the seal 130 (referring to FIG. 1) along the alignment mold 125. In one or more embodiments, the ultrasonic cutter tool 105 may further comprise a cover 215 disposed in proximity to the blade 210 operable to prevent physical access to the blade 210 by an external structure. For example, the cover 215 may be any suitable size and/or shape operable to prevent an operator from disposing an object in a pathway of the blade 210.

As illustrated, an alignment component 220 may be disposed at a first end 225 of the platform 115. The alignment component 220 may be operable to align the blade 210 to be parallel to the apex of the alignment mold 125 (for example, apex 325 in FIG. 3). Any suitable fasteners may be utilized to couple the alignment component 220 to the platform 115. While the alignment component 220 may be illustrated as being disposed at the first end 225, the alignment component 220 is not limited to such a location. The alignment component 220 may be any suitable size, height, shape, and any combinations thereof. For example, the alignment component 220 may comprise rectangular or square shape. In embodiments, the alignment component 220 may comprise any suitable materials, including, but not limited to, metals, nonmetals, polymers, ceramics, composites, and any combinations thereof. During operations, an operator may utilize the alignment component 220 to verify that the blade 210 is aligned to be parallel to the alignment mold 125. At an initial positioning, a side of the alignment component 220 may be parallel to the alignment mold 125. If the ultrasonic cutter tool 105 is positioned so as to abut the blade 210 against the side of the alignment component 220, and the blade 210 is not flush with the side of the alignment component 220, the operator may adjust the blade 210 within the ultrasonic cutter tool 105 to be aligned. If the blade 210 is flush against the side of the alignment component 220, the operator may continue to cut the seal 130 (referring to FIG. 1) disposed at least partially over the alignment mold 125.

Figure 3:
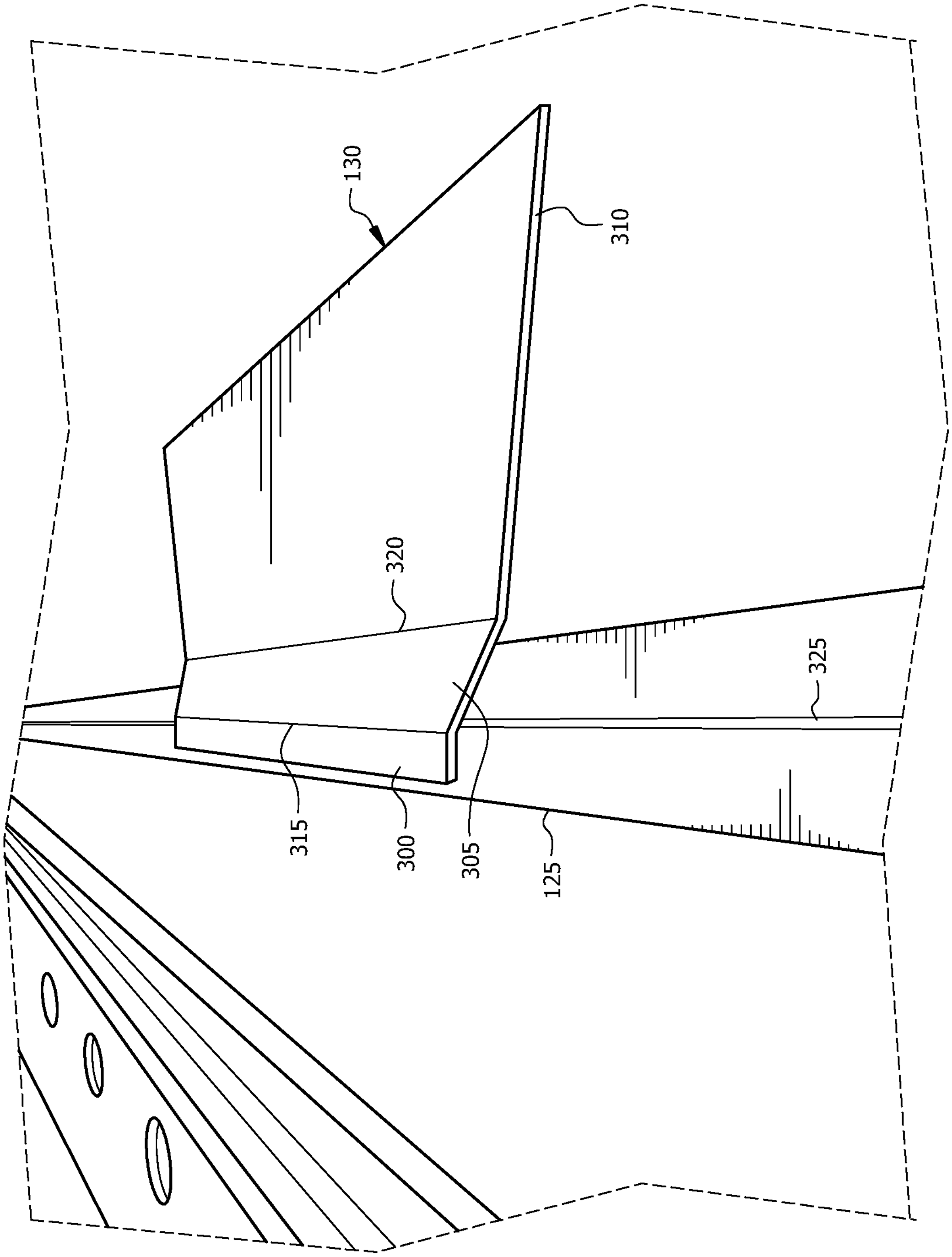
FIG. 3 illustrates an example seal and alignment mold, according to certain embodiments.

FIG. 3 illustrates an example seal 130 disposed on the alignment mold 125. The seal 130 may be any suitable size, height, shape, and any combinations thereof. As disclosed herein, the seal 130 may comprise at least one apex or bend, but the seal 130 is not limited to a singular apex or bend. Without limitations, the seal 130 may comprise a Z-shaped profile, wherein the seal 130 comprises a first leg 300, a diagonal section 305, and a second leg 310. In embodiments, the diagonal section 305 may be disposed between the first leg 300 and the second leg 310. The first leg 300 may be disposed parallel to the second leg 310 and vertically offset from the second leg 310. In one or more embodiments, the length of the first leg 300 may be shorter than the length of the second leg 310. A first bend 315 may be disposed between the first leg 300 and the diagonal section 305, and a second bend 320 may be disposed between the diagonal section 305 and the second leg 310. As disclosed, the first bend 315 may comprise an angle between the first leg 300 and the diagonal section 305, and the second bend 320 may comprise an angle between the diagonal section 305 and the second leg 310. Without limitations, the angle for either the first bend 315 or the second bend 320 may be any suitable angle. The first bend 315 may comprise an equivalent angle or a different angle from the second bend 320. In embodiments, the seal 130 may comprise any suitable materials, including, but not limited to, polymers, ceramics, composites, and any combinations thereof. As illustrated, the first bend 315 may be positioned over or aligned with an apex 325 of the alignment mold 125, wherein the apex 325 may be the top point of the alignment mold 125. The alignment mold 125 may be configured to allow for the apex 325 to accommodate the angle of the first bend 315 of one or more seals 130.

Figure 4:
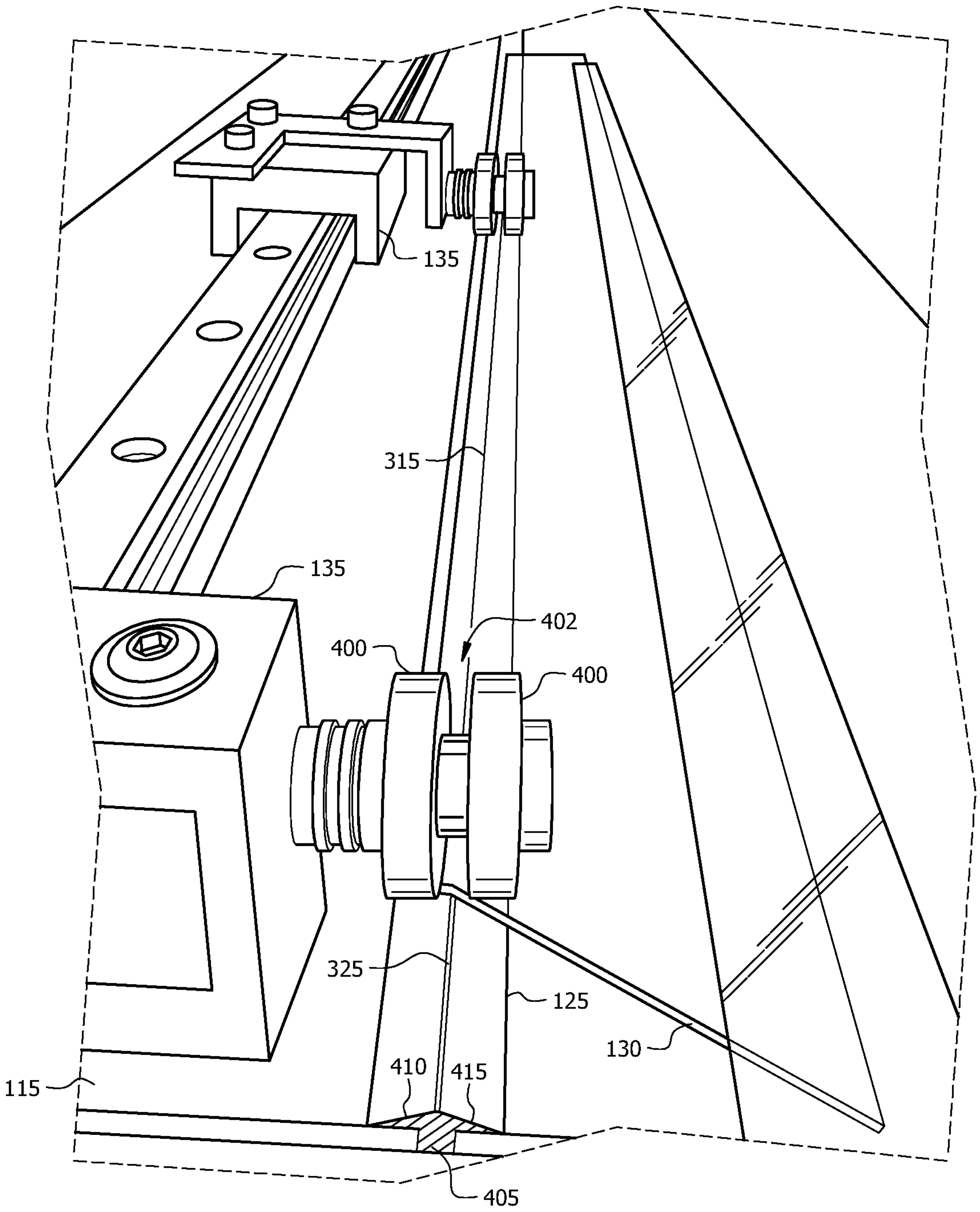
FIG. 4 illustrates an example one or more roller bearing carriages with the seal and alignment mold of FIG. 3, according to certain embodiments.

FIG. 4 illustrates an example one or more roller bearing carriages 135 with the seal 130 and alignment mold 125. Each one of the one or more roller bearing carriages 135 may be any suitable size, height, shape, and any combinations thereof. In embodiments, each of the one or more roller bearing carriages 135 may comprise a set of roller bearings 400, wherein each set of roller bearings 400 is disposed over a portion of the seal 130. In embodiments, a set of roller bearings 400 may consist of two individual roller bearings 400. As illustrated, the first bend 315 may be disposed over the apex 325 of the alignment mold 125. The set of roller bearings 400 may be disposed so as to position the apex 325, and subsequently the first bend 315, in between a gap 402 disposed between each set of roller bearings 400. By disposing each set of roller bearings 400 over and on top of the seal 130, thereby aligning the gap 402 with the apex 325, the one or more roller bearing carriages 135 may align the first bend 315 with the apex 325. In embodiments, the set of roller bearings 400 may be operable to depress or apply a downward force against the seal 130. During operations, each set of roller bearings 400 may be configured to translate along the alignment mold 125 as each of the one or more roller bearing carriages 135 translates along the railing system 110 (referring to FIG. 1).

As illustrated, the alignment mold 125 may comprise a body 405, a first top side 410, and a second top side 415. The first top side 410 and the second top side 415 may be angled in relation to each other, thereby forming the apex 325 of the alignment mold 125. The alignment mold 125 may be any suitable size, height, shape, and any combinations thereof. In embodiments, the alignment mold 125 may comprise any suitable materials, including, but not limited to, polymers, ceramics, composites, rubber, and any combinations thereof. In one or more embodiments, the alignment mold 125 may be at least partially inserted into the platform 115, wherein the body 405 may be contained within the platform 115, and the first top side 410 and the second top side 415 may extend from the body out and away from the platform to form the apex 325.

With reference to FIGS. 1-4, a method as presented in the present disclosure may be described. An operator may dispose the seal 130 at least partially over the alignment mold 125 in order to align the first bend 315 with the apex 325 of the alignment mold 125. The operator may then dispose the one or more roller bearing carriages 135 over at least a portion of the seal 130 by translating the one or more roller bearing carriages 135 along the railing system 110, wherein this translation results in the sets of roller bearings 400 translating over the portion of the seal 130. As sets of roller bearings 400 translate over the portion of the seal 130, the first bend 315 may be aligned with the apex 325. Once aligned, the operator may secure the position of the seal 130 relative to the alignment mold 125. To verify alignment, the operator may visually determine or inspect that the first bend is aligned with the apex 325 by referring to a reference marking. If the first bend 315 is in the tolerance of the reference marking, the seal 130 may be secured relative to the alignment mold 125. In embodiments, the operator may secure the seal 130 through any suitable methods, including, but not limited to, encapsulating the seal 130 with tape. The operator may then position the ultrasonic cutter tool 105 to cut the seal 130. The operator may actuate the mechanical adjuster 200 to move the blade 210 along an x-axis, y-axis, z-axis, or any combinations thereof in order to position the blade 210 relative to the apex 325. The blade 210 may be positioned offset from the apex 325 by a distance. The operator may then verify that the blade 210 is aligned with the alignment mold 125 via the alignment component 220. If aligned, the ultrasonic cutter tool 105 may be actuated, by power provided by the power source 120, to vibrate the blade 210 at a designated frequency. As the blade 210 vibrates, the operator may translate the ultrasonic cutter tool 105 along the railing system 110 to cut the seal 130. In embodiments, as the ultrasonic cutter tool 105 translates, the one or more roller bearing carriages 135 may be displaced. The ultrasonic cutter tool 105 may cut the first leg 300 of the seal 130 with the blade 210.

The present disclosure may provide numerous advantages, such as the various technical advantages that have been described with respective to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A cutting system for cutting a seal, the cutting system comprising:

an ultrasonic cutter tool disposed onto a railing system coupled to a platform, wherein the ultrasonic cutter tool is configured to translate along the railing system;

a power source electrically coupled to the ultrasonic cutter tool;

an alignment mold disposed parallel to the railing system and offset by a distance; and one or more roller bearing carriages coupled to the railing system, wherein:

each of the one or more roller bearing carriages comprises a set of roller bearings;

each set of roller bearings is disposed over the alignment mold to align a gap between each set of roller bearings with an apex of the alignment mold such that the seal is configured to bend over the apex; and each set of roller bearings is configured to translate along the alignment mold as each of the one or more roller bearing carriages translates along the railing system.

2. The cutting system of claim 1, further comprising a mechanical adjuster coupled to the ultrasonic cutter tool, wherein the mechanical adjuster comprises one or more actuators operable to translate the ultrasonic cutter tool in relation to the railing system.

3. The cutting system of claim 1, wherein the ultrasonic cutter tool comprises a blade, wherein the blade is positioned above the alignment mold and offset from the apex of the alignment mold.

4. The cutting system of claim 3, further comprising an alignment component disposed at a first end of the platform operable to align the blade parallel to the apex of the alignment mold.

5. The cutting system of claim 3, wherein the seal is disposed on the alignment mold, wherein the seal is aligned with the apex of the alignment mold, wherein the ultrasonic cutter tool is operable to cut the seal via the blade as the ultrasonic cutter tool translates along the railing system.

6. The cutting system of claim 5, wherein the seal comprises a Z-shaped profile, wherein the Z-shaped profile comprises a first bend disposed between a first leg and a diagonal section.

7. The cutting system of claim 1, wherein the alignment mold comprises a body, a first top side, and a second top side, wherein the first top side and the second top side are configured to form the apex of the alignment mold.

8. A method of cutting a seal, comprising:

disposing the seal over an alignment mold disposed parallel to a railing system;

disposing one or more roller bearing carriages over the seal;

securing the seal to the alignment mold;

adjusting the seal to align a first bend of the seal with an apex of the alignment mold; and translating an ultrasonic cutter tool along the railing system to cut the seal, wherein each of the one or more roller bearing carriages comprises a set of roller bearings, wherein each set of roller bearings is disposed over the alignment mold to align a gap between each set of roller bearings with the apex of the alignment mold, wherein each set of roller bearings is configured to translate along the alignment mold.

9. The method of claim 8, further comprising actuating a power source electrically coupled to the ultrasonic cutter tool as the ultrasonic cutter tool translates along the railing system to provide power to the ultrasonic cutter tool.

10. The method of claim 8, further comprising displacing the one or more roller bearing carriages as the ultrasonic cutter tool translates along the railing system.

11. The method of claim 8, further comprising actuating a mechanical adjuster coupled to the ultrasonic cutter tool to translate the ultrasonic cutler tool in relation to the railing system.

12. The method of claim 11, further comprising translating the ultrasonic cutter tool along a x-axis in relation to the railing system.

13. The method of claim 11, further comprising translating the ultrasonic cutter tool along a y-axis in relation to the railing system.

14. The method of claim 11, further comprising translating the ultrasonic cutter tool along a z-axis plane in relation to the railing system.

15. The method of claim 8, further comprising aligning a blade of the ultrasonic cutler tool to be parallel to the apex of the alignment mold via an alignment component.

16. The method of claim 15, wherein the blade is positioned offset from the apex of the alignment mold.

17. The method of claim 8, wherein the seal comprises a Z-shaped profile, wherein the Z-shaped profile comprises a first bend disposed between a first leg and a di agonal section.

18. The method of claim 17, further comprising cutting the first leg of the seal with the ultrasonic cutter tool.

19. The method of claim 8, wherein the alignment mold comprises a body, a first top side, and a second top side, wherein the first top side and the second top side are configured to form the apex of the alignment mold.

* * * * *